US011838572B2

(12) United States Patent
Robinson et al.

(10) Patent No.: US 11,838,572 B2
(45) Date of Patent: Dec. 5, 2023

(54) STREAMING VIDEO TRUNKING

(71) Applicant: RingCentral, Inc., Belmont, CA (US)

(72) Inventors: Charley Robinson, Denver, CO (US); Gustavo García, Madrid (ES); Badri Rajasekar, Walnut Creek, CA (US)

(73) Assignee: RingCentral, Inc., Belmont, CA (US)

( * ) Notice: Subject to any disclaimer, the term of this patent is extended or adjusted under 35 U.S.C. 154(b) by 0 days.

(21) Appl. No.: 17/854,764

(22) Filed: Jun. 30, 2022

(65) Prior Publication Data

US 2023/0199239 A1    Jun. 22, 2023

Related U.S. Application Data

(63) Continuation of application No. 17/557,909, filed on Dec. 21, 2021.

(51) Int. Cl.
*H04N 21/25* (2011.01)
*H04N 21/258* (2011.01)
*H04L 67/12* (2022.01)
*H04N 21/239* (2011.01)
*H04N 21/222* (2011.01)
*H04N 21/24* (2011.01)
*H04N 21/2187* (2011.01)

(52) U.S. Cl.
CPC ....... *H04N 21/25841* (2013.01); *H04L 67/12* (2013.01); *H04N 21/2187* (2013.01); *H04N 21/222* (2013.01); *H04N 21/2393* (2013.01); *H04N 21/2404* (2013.01)

(58) Field of Classification Search
None
See application file for complete search history.

(56) References Cited

U.S. PATENT DOCUMENTS

2010/0325209 A1* 12/2010 Thapa ................. H04L 45/00
                                                        709/204

* cited by examiner

*Primary Examiner* — Cai Y Chen

(57) ABSTRACT

Systems, methods, and media are disclosed for propagating video streams based on geographical proximity and required transmission latency. A first video stream is received from a first presenting client device at a first origin video server connected to at least one other origin video server forming a mesh network. The first video stream is relayed to at least a second origin video server from the first presenting client device. The first video stream is transmitted from the second origin video server to an edge video server. The first video stream is received from the second origin video server by one or more edge video servers. The first video stream is broadcast to a plurality of participant client devices. A second video stream is received from a second presenting client device. The second video stream is transmitted via the second origin video server to the plurality of participant client devices.

20 Claims, 4 Drawing Sheets

STREAMING VIDEO TRUNKING

CROSS-REFERENCE TO RELATED APPLICATIONS

This patent application is a continuation of U.S. application Ser. No. 17/557,909, filed Dec. 21, 2021, which is incorporated herein by reference in its entirety.

TECHNICAL FIELD

Embodiments of the invention generally relate to streaming video trunking. More specifically, embodiments of the invention relate to technologies for propagating large-scale video streams based on geographical proximity and required response latency.

Live streaming video requires low latency video transmission to enable smooth interactive dialogue between presenters, such as in the case of a video stream of a moderated panel. In such a case, low interactive network latency is critical for smooth verbal communication between panelists. On the other hand, certain viewers of a video stream will not be disturbed by (or even aware of) a multi-second delay in viewing the stream as long as those viewers are certain not to be participants at a subsequent time. As for those viewing users who may need to jump into the dialog and ask a question, for example, a low latency connection is necessary to facilitate a smooth interactive dialog, because if a delayed viewing user interjects a question after a multi-second delay, the dialog may have already advanced to a new topic. In general, it would be desirable to provide low-latency connections to live stream presenters and those viewers who may become active participants, while conserving network resources for providing access to the resulting video stream to exclusive viewers of the stream. As such, improved techniques are needed for propagating large-scale video streams based on factors such as geographical proximity and required network latency for certain participants.

SUMMARY

Embodiments of the invention address the above-identified need by providing mechanisms for propagating large-scale video streams based on factors such as geographical proximity and network latency. In particular, in a first embodiment, the invention includes a system for propagating one or more large-scale video streams based on network proximity and required transmission latency, the system comprising: a plurality of origin video servers arranged in an interconnected mesh network, one or more presenting client devices connected to an inbound routing origin video server in the plurality of origin video servers, wherein each origin video server in the plurality of origin video servers comprises at least one origin video server processor coupled with at least one non-transitory memory storing computer executable instructions that when executed by the at least one origin video server processor cause the system to carry out actions comprising: receiving, at a first origin video server in the plurality of origin video servers, at least one video stream from a first presenting client device in the one or more presenting client devices, relaying to at least a second origin video server in the plurality of origin video servers, the at least one video stream from the one or more presenting client devices, and transmitting, to a second presenting client device in the one or more presenting client devices, the at least one video stream from the one or more presenting client devices, a plurality of edge video servers, each edge video server connected to at least one outbound-routing origin video server in the plurality of origin video servers, a plurality of participant client devices, each participant client device in the plurality of participant client devices connected to at least one participant-serving edge video servers in the plurality of edge video servers, wherein each edge video server in the plurality of edge video servers comprises at least one edge video server processor coupled with at least one non-transitory memory storing computer executable instructions that when executed by the edge video server processor cause the system to carry out actions comprising: receiving, from the at least one outbound-routing origin video server, the at least one video stream and one or more streaming video assets, rendering a production video stream based on the at least one video stream and the one or more streaming video assets, and transmitting the production video stream to at least one of the plurality of participant client devices, wherein each participant client device in the plurality of participant client devices comprises at least one processor and at least one non-transitory memory storing computer executable instructions that when executed by the processor cause the system to carry out actions comprising: receiving a data stream corresponding to the production video stream, and displaying the production video stream based on the data stream.

In a second embodiment, the invention includes a method of propagating one or more large-scale video streams based on geographical proximity and required transmission latency, the method comprising: receiving, at a first origin video server in a plurality of origin video servers, a first video stream from a first presenting client device of one or more presenting client devices, wherein each origin video server in the plurality of origin video servers is connected to at least one other origin video server in the plurality of origin video servers forming a mesh network, relaying, to at least a second origin video server in the plurality of origin video servers, the first video stream from the first presenting client device, transmitting, from the second origin video server to one or more edge video servers, the first video stream, receiving, by one or more edge video servers, from the second origin video server, the first video stream, broadcasting the first video stream to a plurality of participant client devices, receiving a second video stream from a second presenting client device of the one or more participant client devices, and transmitting, via the second origin video server in the plurality of origin video servers, the second video stream to the plurality of participant client devices.

In a third embodiment, the invention includes one or more non-transitory computer-readable media storing computer-executable instructions that, when executed by a processor, perform a method comprising: receiving, at a first origin video server in a plurality of origin video servers, a first video stream from a first presenting client device in a plurality of presenting client devices, wherein each origin video server in the plurality of origin video servers forms a mesh network with at least one other origin video server in the plurality of origin video servers, broadcasting, to at least a second origin video server in the plurality of origin video servers, the first video stream, transmitting, to the plurality of presenting client devices, the first video stream, receiving, from at least one outbound-routing origin video server, the first video stream, receiving a second video stream from a second presenting client device of the one or more presenting client devices, and transmitting, via the second origin video server in the plurality of origin video servers, the second video stream to the plurality of presenting client devices.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
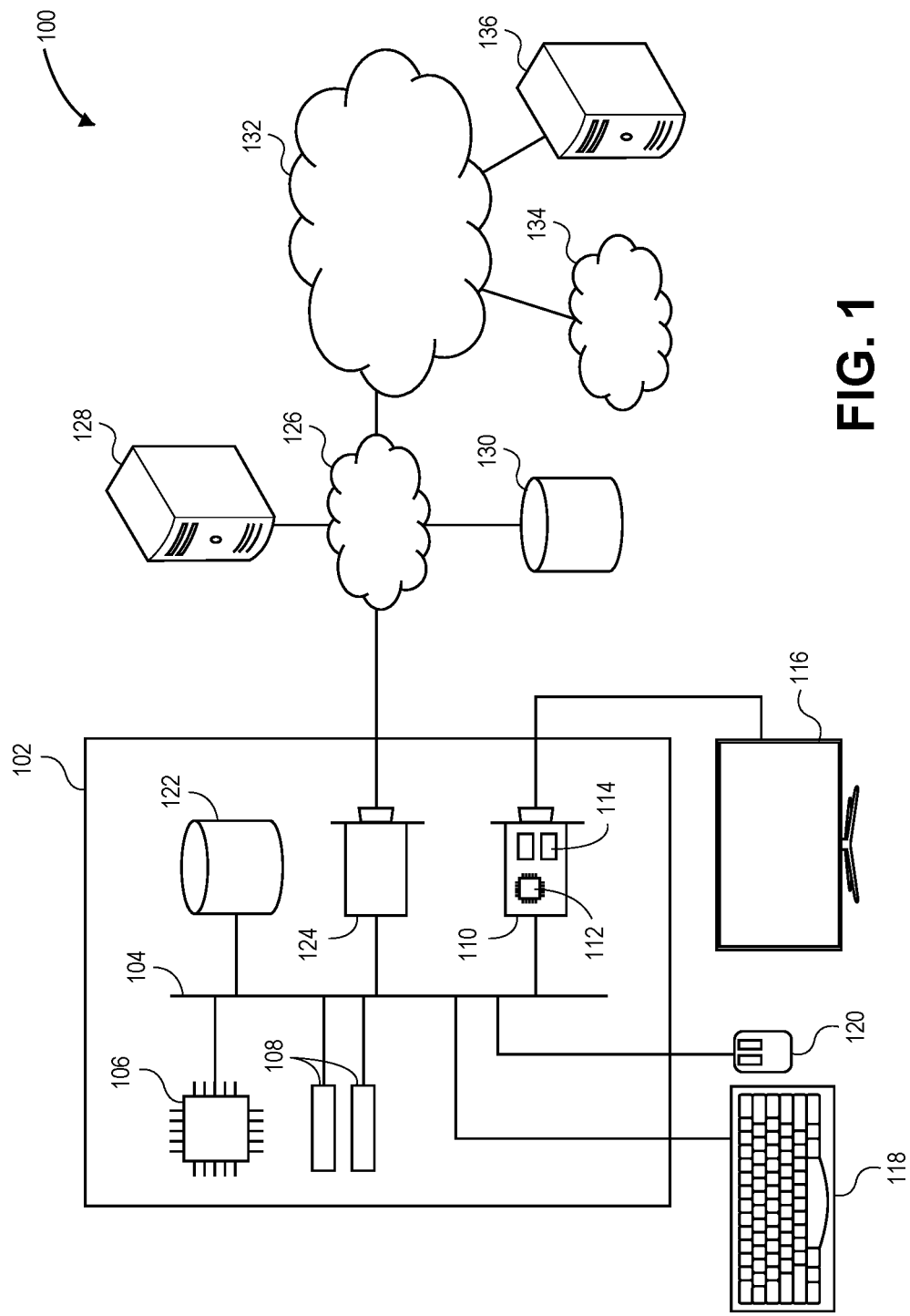
FIG. 1 depicts an exemplary hardware platform for certain embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

Context and Concepts of the Invention

As used herein, the term "video live streaming" means streaming, substantially in real time, a video stream. In general, such a video stream may comprise a graphical background, one or more video streams, and other graphical layout components such as scrolling text, etc. video live streaming may involve providing a proprietary or standardized video stream to a media provider, whose media platform may be leveraged to scale out a substantially live broadcast to a multitude of viewers of the live stream. Media providers include, inter alia, FACEBOOK, LINKEDIN, YOUTUBE, PERISCOPE, and TWITCH.

In some embodiments, a video stream may be produced for streaming to a virtual event hosting platform. As used herein a "virtual event hosting platform" means an immersive, interactive online conference-hosting platform. Such platforms allow meeting participants to view presentations, participate in event sessions, network online, exchange virtual business cards, and engage in networking opportunities while preserving a record of connections made while attending a virtual event. A virtual event hosting platform may also enable hosting of in-person events as well as hybrid events that are hosted both in-person and virtually (online). A "virtual event hosting system" is an instantiation of a set of technical resources that provide for hosting of one or more virtual events on a virtual event hosting platform. In these embodiments, distributed mixing of video for live streaming is employed to permit presenting users on a virtual event hosting platform to interact with each other in a low-latency, interactive manner to facilitate smooth interactive dialog. Similarly, viewing users that do not need a low-latency connection for direct interaction with the presenting users can access an associated video stream from with a time delay so that the video stream can be provided to the viewing user in such a way to conserve network bandwidth resources, i.e., by pushing the streaming video out to a server that is geographically proximate to the viewing user.

The subject matter of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Operational Environment for Embodiments of The Invention

FIG. 1 illustrates an exemplary hardware platform for certain embodiments of the invention. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses, or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 124 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments, no display is present, while in others it is integrated into computer 102. Similarly, peripherals such as keyboard 118 and mouse 120 are connected to system bus 104. Like display 116, these peripherals may be integrated into computer 102 or absent. In some embodiments, additional peripherals such as a microphone or video camera may also be present and connected to system bus 104. In some embodiments, such peripherals may be detachable connected to computer 102 via a wired or wireless connection. In other embodiments, such as a tablet or smartphone, these peripherals are integrated into computer 102. Also connected to system bus 104 is local storage 122, which may be any form of computer-readable media and may be internally installed in computer 102 or externally and removably attached.

Such non-transitory, computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write, and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 2:
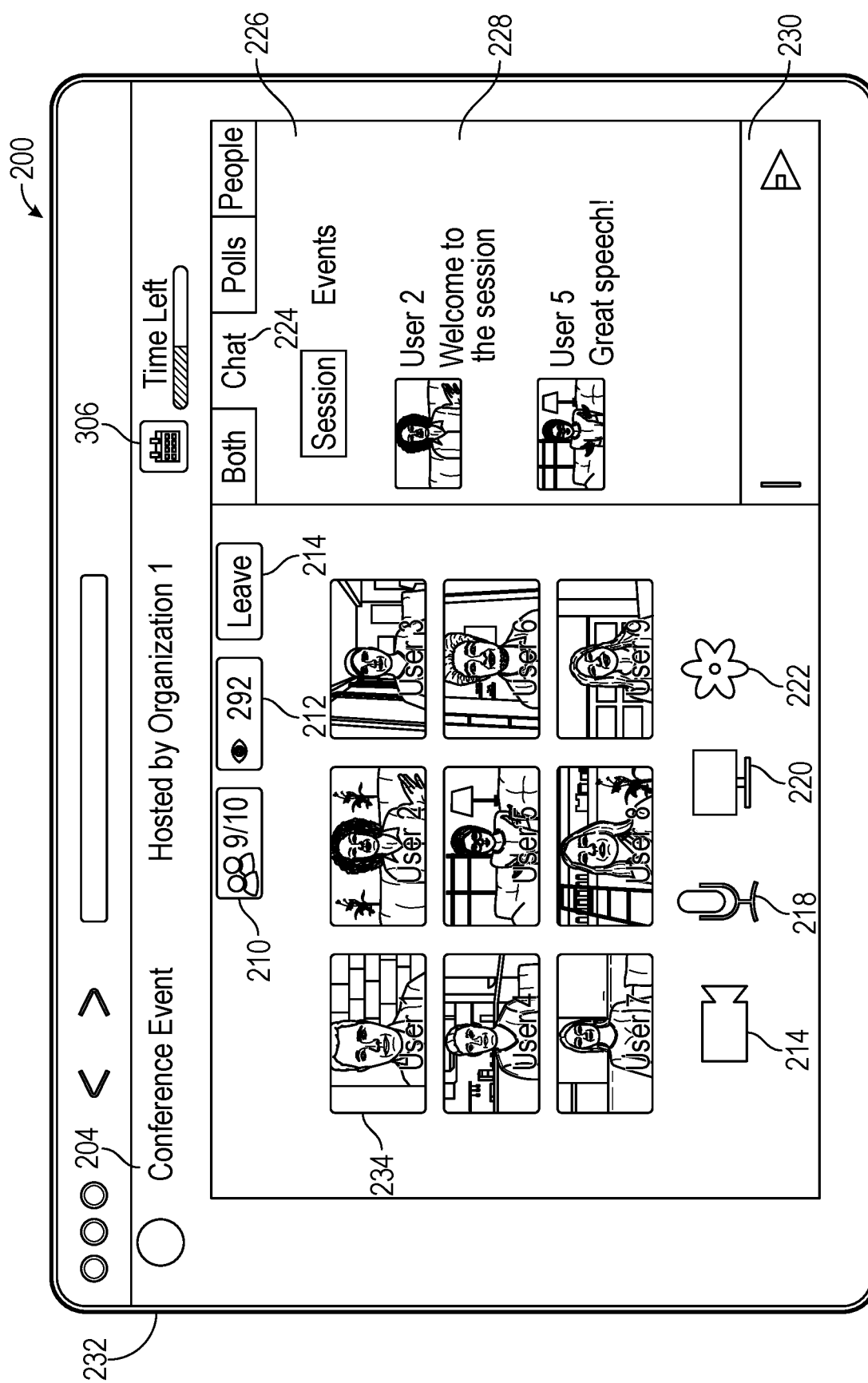
FIG. 2 depicts a representative user interface illustrating a video stream in the context of a virtual event hosting system or a virtual meeting.

FIG. 2 depicts a representative user interface 200 illustrating a video stream in the context of a virtual event hosting system. In some embodiments, session user interface 202 includes a plurality of video windows 208 each associated with an individual video stream corresponding to a respective user. In some embodiments, the video windows 208 may be included as part of a composite video stream mixed in connection with a distributed mixing service as explained in connection with the present teachings. For example, embodiments are contemplated in which an edge server mixes a plurality of individual video streams into a mixed video stream including the plurality of video windows 208. Accordingly, the edge server may be able to apply layout changes to adjust the presentation of the video windows 208 within the graphical user interface 200. In some embodiments, up to twenty video windows 208 may be included on the graphical user interface 200 at a time such that the windows may be displayed at a reasonable size. Alternatively, in some embodiments, more or fewer video windows 208 may be included. Further still, in some embodiments, a size of the video windows may be adjusted based at least in part on the number of users and/or user activity. For example, in some embodiments, it may be desirable to automatically adjust the size of at least one of the video windows based on determining that a particular presenting user is actively speaking.

In other embodiments, session user interface 202 may be accessed by selecting a session option of viewing option interface object 226. In some such embodiments, session user interface 202 may be associated with a breakout session of an event provided in connection with a virtual event hosting platform. For example, in some embodiments, attendees of an event may be divided out into a plurality of sessions. Accordingly, sessions may provide a virtual environment for users to talk amongst themselves resulting in a more personal experience. Embodiments are contemplated where one to nine or more presenting users present a topic to thousands of viewers in an event stage and then the users are separated into a plurality of sessions to discuss the topic and ask questions about the topic. In some such embodiments, a user who has merely been viewing may be promoted to a user who may begin participating by presenting his or her own video stream. In these embodiments, the user would go from a viewing user who can accept a time delayed video stream to a user that requires a low-latency connection. In this case, a user that switches from a viewing only user to a presenting user could have his or her connection upgraded as described below. In some other embodiments, the temporarily presenting user may keep his or her time delayed connection and pre-record a question (in the form of a video clip) that is then queued to be presented to a larger audience within the livestream. Subsequent responses by other users, for example in a breakout session may similarly be pre-recorded and played back with a time delay, or multiple breakout room participants may have their connections upgraded to low-latency connections.

In another example, the session user interface 202 is used by a group of participant users to discuss a topic associated with an event. Accordingly, users 1-9 may be joined into a session group such that the video streams of each user are shared directly with the other users using, for example, a web real-time message transport protocol (RTMP). In some embodiments, a plurality of viewing users may tune in to view the discussion, as denoted by the viewers indicator 212 indicating a number of viewing users. Accordingly, in such embodiments, individual video streams corresponding to participant users 1-9 are mixed into a composite video stream and provided to various viewing users. For example, participant users 1-9 may receive a studio view corresponding to their own audio and video as well as the other nine users with which the presenting user is interacting.

In some embodiments, graphical user interface 200 includes event title 204 for the event and schedule interface object 206. In some embodiments, schedule interface object 206 may be selected to access an event schedule for the event which may be predefined for the event and may be updated during the event. Additionally, in some embodiments, schedule interface object 206 includes an indication of an amount of time remaining for the event, as shown. For example, the indication of time remaining may show the progress of the event with respect to the total event time. The indication may appear as a progress bar, as shown, but may alternatively or additionally include the time remaining as an hour and minute value or as a percentage of the total time for the event.

In some embodiments, one or more indicator objects are provided, such as participants indicator 210 indicating a number of active participants and attendee indicator 212 indicating a number of attendees watching the composite video stream. In some embodiments, exit interface object 214 may be included, which may exit the event or the current video session in response to user actuation. As such, embodiments are contemplated in which exit interface object 214 may be used, for example, to leave a meeting, end a video stream, or disconnect from a video stream. Additionally, included in connection with graphical user interface 200 are camera interface object 216, microphone interface object 218, screen interface object 220, and settings interface object 222. In some embodiments, camera interface object 216 and microphone interface object 218 may be used to toggle activation of the user's camera and microphone respectively. Accordingly, a user may select camera interface object 216 to stop sharing the user's video data and select microphone interface object 218 to optionally mute the user's microphone.

Screen interface object 220 may be selected to share the user's screen. For example, embodiments are contemplated in which screen interface object 220 switches video data that is shared from the camera video data to the user's screen. Accordingly, the user may be able to share live video footage of the user's computer screen or a screen from another user device with presenting users and other attendees. Further, embodiments are contemplated in which the user may simultaneously share the user's screen and video data from the user's camera. Further still, in some embodiments, screen interface object 220, when selected, presents the user with options for selecting which specific screen or window to share, for example, where the user has multiple screens and application windows open at once.

Settings interface object 222, when selected, may present the user with a set of options to change various settings associated with the event, the video streaming service, and the graphical user interface 200. For example, in some embodiments, the settings interface object 222 allows the user to adjust various settings such as, switching the active input devices and output devices for audio and video, change microphone monitoring settings, change output volume, adjust video quality, and other related settings.

In some embodiments, graphical user interface 200 further includes one or more selectable tabs 224, such as, for example, a booth tab, a chat tab, a polls tab, and a people tab, as shown. Here, the booth tab may be used to provide a plurality of virtual booths allowing individuals or organizations to present relevant event information. In some embodiments, the chat tab may be used to provide a messaging environment for various users, as will be described in further detail below. The polls tab may provide a way for users to give answers to polling questions. For example, a participant user may present a polling question such that attendees can access the polls tab to provide answers to a polling question. Results of the polling may then be forwarded to the participant user or may be available to the attendees after a polling time has expired or once every user has answered the polling question. The people tab may be selected to present information about the people in the event or in a specific session. In some embodiments, the people tab may include biography information and contact information for each speaker at the event.

In some embodiments, the graphical user interface 200 may further include a viewing option interface object 226, which may be used to select the viewing option that is displayed in the graphical user interface 200. For example, a user may select between an event option and a session option, as will be described in further detail below. In some embodiments, the event option may be selected to view a main stage of an event and the session option may be selected to view a breakout session of the event.

Figure 3:
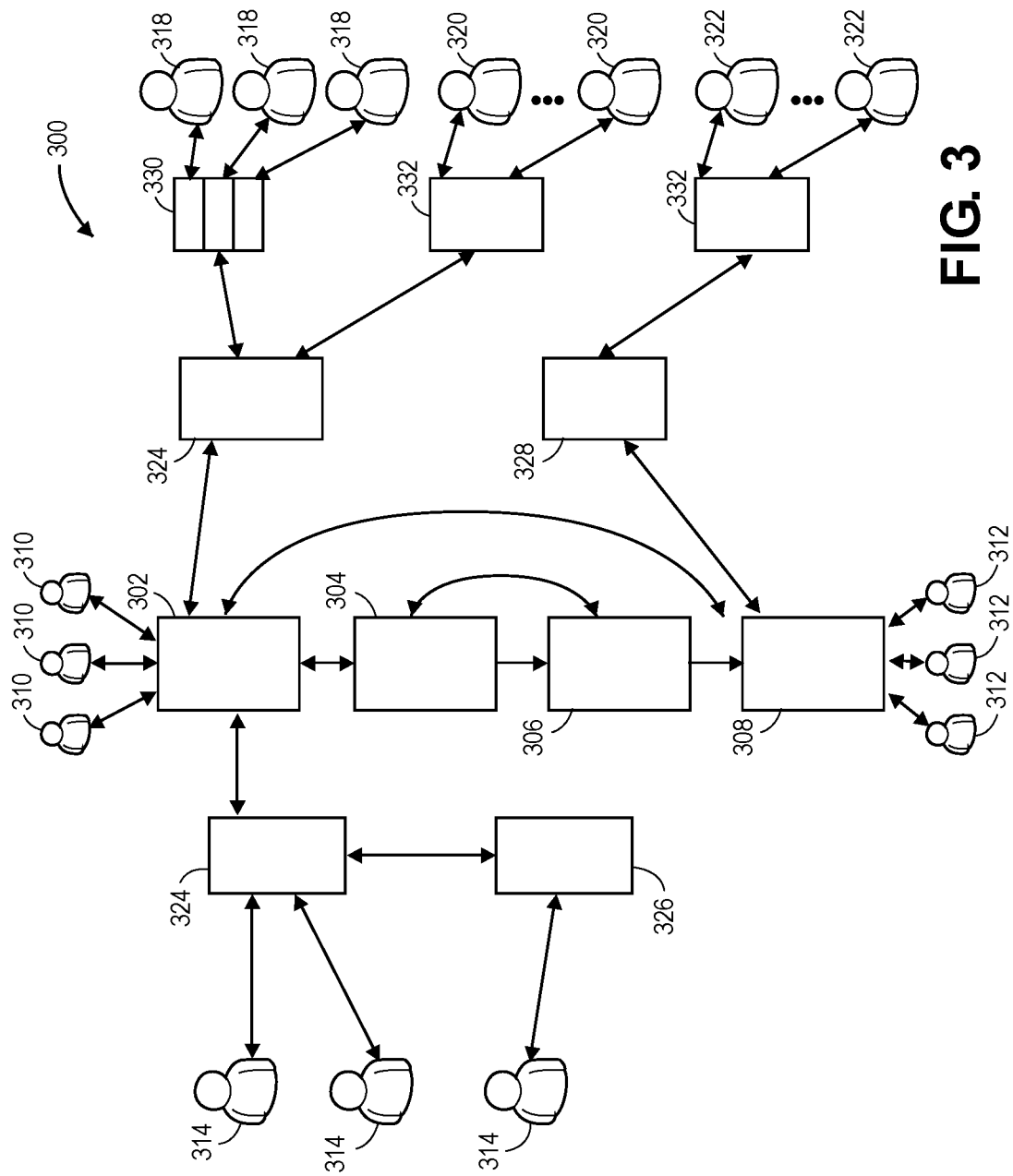
FIG. 3 illustrates elements of a system for carrying out embodiments of the invention.

In some embodiments, messaging window 228 may be included allowing users to communicate via textual messages or multimedia messages. Accordingly, the messaging window 228 may present a plurality of user messages from various users. Embodiments are contemplated in which both presenting users and attendees are able to interact within messaging window 228. Alternatively, in some embodiments, messaging window 228 may be restricted to presenting users or to other specific users. Additionally, message input interface object 230 may be included allowing the user to compose and send a message to be posted in the messaging window visible to other users. In some embodiments, the messages may include any of textual communications or file attachments, reactions, emojis, and other types of message communications FIG. 3 illustrates elements of system 300 for carrying out embodiments of the invention. In some embodiments, system 300 facilitates distributing or propagating one or more large-scale video streams based on network proximity and required transmission latency. In these embodiments, certain users of system 300 require low transmission latency connections and other users, such as those users who are viewing the stream only, can tolerate a user experience for which a significant time delay (e.g., 2 seconds) is present without negatively impacting user experience. For example, presenting users in a video stream who are engaging in dialog will require a low-latency interactive user experience (e.g., 200 milliseconds) in order for the dialog to feel smooth and interactive without the presenting users having to insert pauses between exchanges during the dialog.

In some embodiments, it is attempted to minimize a number of servers deployed, to reduce cloud infrastructure costs associated with network bandwidth and processor utilization. In these embodiments, participants are aggregated onto a minimum set of origin and edge video servers. In some such embodiments, one server per geographical region is deployed. In these embodiments, a goal is to improve user experience by avoiding overloading video servers. In some such embodiments, the number of participants on each server is proactively monitored such that new servers may be proactively provisioned and deployed in an appropriate geographical region when a number of participants on a particular server approaches a predetermined threshold number of participants. By proactive deployment of servers, it is meant that trends associated with the number of participants on each server are monitored so that a server may be deployed in advance of overloading so that participants may be switched to an alternate server without encountering degraded performance.

In some embodiments, it is attempted to minimize interactive network latency by reducing a number of end-to-end network hops involved in transmitting video streams between low latency participants. For example, an optimal routing would involve transmitting a live video stream directly from a presenter, via an origin video server, to a single edge server and then to a viewing user (whether or not the viewing user is also a presenter). In this example, use of multiple edge video servers is avoided. In some relatively smaller sessions, it may be possible even to transmit directly from a presenter to a viewing user directly via a single origin video server, where an origin video server effectively functions as both an origin video server and an edge video server. In some embodiments, it is possible to optimize user experience, i.e., video quality and latency by connecting users (both presenting users and viewing users) to a closest server in an interconnected mesh network, so that network transmission mechanisms are optimized, such as retransmissions under packet loss.

In some embodiments, connections are dynamically distributed among the origin and edge video servers so as to prioritize low-latency connections within each node within the mesh network by assigning connected client devices so as to employ a minimum number of origin and edge video servers in a particular geographic location or overall. In some embodiments, video streams received at origin or edge video servers may be substantially simultaneously broadcast to all other connected video servers using various networking technologies such as transmitting via multiple physical network connections or employing multicast technology to communicate from a single sender to multiple receivers on a network.

For viewing users, such as event attendees, it may be more important to receive a video stream that is provided from a network resource that is geographically closer to the viewing user even if there is a significant broadcast delay, as long as the video itself is smooth. That is to say a time-shifted but smooth "live" video stream provides an excellent user experience for a viewing user even if such a delayed interactive user experience would be quite suboptimal for a presenting user who is engaging in real-time dialog with another presenting user.

To implement such a system, presenting user devices such as presenting user devices 310 and presenting user devices 312 may be directly connected to a representative mesh network of origin video servers such as origin video server 302, origin video server 304, origin video server 306, and origin video server 308. Origin video servers may also be referred to as trunk video servers and they may be implemented as general-purpose server computer systems (physical or virtual) of a type generally described in connection with FIG. 1. A trunk video server forms a trunk within a mesh network such that low-latency, high-bandwidth video streams may be propagated between trunk video servers within a particular mesh network. As depicted, presenting user devices 310 are directly connected to origin video server 302 and presenting user devices 312 are directly connected to origin video server 308. It is understood that any presenting user device can be connected to any origin video server in the mesh network. In some embodiments, the representative mesh network may be a fully connected mesh network, meaning that each node in the fully connected mesh network has a direct connection to every other node in the mesh network.

In some other embodiments, the mesh network may be a partially connected mesh network in which each node in the mesh network is only indirectly connected to every other node in the mesh network. In some such embodiments, the mesh network is self-configuring and establishes direct connections between nodes as needed to maintain a sufficiently low-latency connection between attached presenting user devices 310 and 312. As depicted in FIG. 3, origin video servers 302 and 308 have a direct connection so that presenting user devices 310 and 312 have a low-latency connection to each other to facilitate the interactive user experience associated with an interactive dialog between one or more of presenting user devices 310 and 312.

In some such embodiments, presenting client devices 312 are connected to an inbound routing origin video server, such as origin video server 308. The inbound routing origin video server may be preferably physically located in the same geographical location as the presenting client devices 312 to which they are connected. In some embodiments, the inbound routing origin video server 308 has a low-latency connection to the one or more presenting client devices to which it is connected regardless of whether it is in the same physical geography. In some embodiments, each origin video server 302-308 has a processor and a non-transitory memory storing computer executable instructions that when executed carry out certain actions. In these embodiments, a video stream is received at a first origin video server (such as origin video server 308) from at least one of the presenting client devices 312. Next, a video stream is relayed from another one of the presenting client devices (such as presenting client device 310) to at least a second origin video server (such as origin video server 302). Finally, a video stream is transmitted from the one or more presenting client devices to the other presenting client devices, via the mesh network formed by origin video servers 302-308. In these embodiments, each of the users of the presenting client devices may view a collection of the currently active live video streams corresponding to each of the presenters so that each of the presenters can interact in a performant, interactive audio-visual manner. In this way, a lively dialog can be conducted without interactive delays or inadvertent crosstalk between presenting users in a panel presentation, for example. It is understood that a live video stream (also referred to as a video stream) as used herein may comprise multiple multimedia streams, including one or more audio streams and one or more video streams. In some such embodiments, these multiple streams may be transmitted and played back concurrently.

In some embodiments, a plurality of edge video servers is provided, such as edge video servers 324, 326, and 328. In these embodiments, each edge video server 324, 326, and 328 is connected to at least one outbound-routing origin video server in the plurality of origin video servers, such as origin video server 302. In these embodiments, a plurality of participant client devices 314, 318, 320, and 322 is provided such that each participant client device in the plurality of participant client devices connected to at least one participant-serving edge video server in the plurality of edge video servers. In some such embodiments, each edge video server comprises a processor and a non-transitory memory storing computer executable instructions to carry out certain actions as follows. The video stream and associated streaming video assets are received from at least one outbound-routing origin video server 302. In some embodiments, a production composite video stream is mixed or rendered (e.g., at edge video server 324) based on the video stream and the associated streaming video assets. Finally, a resulting production composite video stream may be transmitted to at least one of the participant client devices 314, 318, 320, and 322 and displayed in connection with a display associated with the particular participant client device. In some embodiments, video streams are transmitted separately to the client devices, where the video streams may be combined into a composite multimedia stream for viewing by an end user. In some embodiments, the video streams remain uncombined and may be displayed separately and/or independently. In some embodiments, various video stream transport technologies are applied. For example, various packet-based media protocols may be employed from the family of Real-time Transport Protocol (RTP) and associated control protocols such as, for example, Real-time Transport Control Protocol (RTCP) which works hand-in-hand with RTP. RTCP provides out-of-band statistics and control information for an RTP session. In some other embodiments, Real-time Streaming Protocol (RTSP) may be employed.

In some embodiments, transmitting the production video streams involves transmitting a production video stream to one or more content delivery networks (CDN). In these embodiments, edge video servers 324 and 328 instruct the one or more CDN 332 to respond to requests for the production video stream. In some such embodiments, CDN 332 provide cached access to the production video streams to various participant client devices 318, 320, and 322. In some embodiments, such provisioning of cached streams allows the streams to be provided to viewing users in a way that the network connection between a CDN node and the viewing user is located in a geographically proximate manner, sharing a common geography. An additional advantage of using CDN to deliver streaming video is that the provision of streaming video can be outsourced in a scalable way to a CDN provider, leveraging the CDN provider's economies of scale in providing high-bandwidth connections to a multitude of viewing users. In some embodiments, a real time content delivery network (RTCDN) is employed, which enables video streaming with low interactive delay. In some such embodiments, the low interactive delay introduces an interactive delay of no more than 200 ms.

Figure 4:
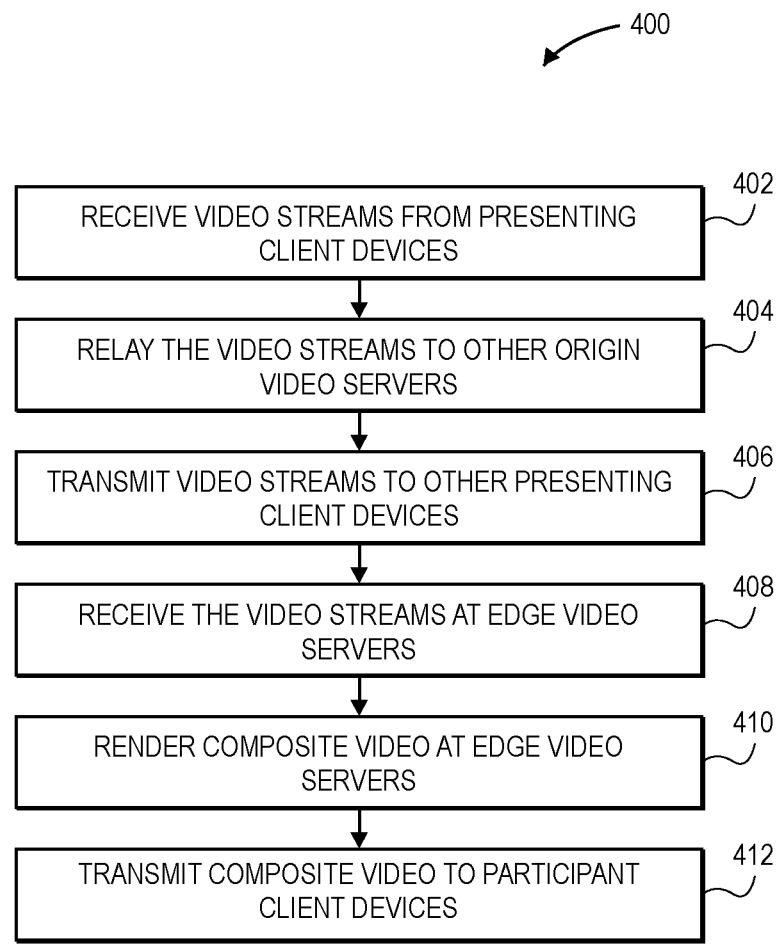
FIG. 4 depicts a flowchart illustrating the operation of a method in accordance with embodiments of the invention.

FIG. 4 depicts a flowchart 400 illustrating the operation of a method in accordance with embodiments of the invention. At step 402, one or more video streams are received by one or more origin video servers such as origin server 302. In some embodiments, the video streams are received from one or more presenting client devices, such as presenting client devices 310. In these embodiments, low-latency video transmission may occur between multiple presenting client devices 310, for example when multiple users of presenting user client devices 310 form a presenting panel. Because multiple presenting users are working on presenting user client devices 310 that are connected to the same origin video server 302, a low-latency exchange of dialog can seamlessly occur, and interactive video delays between the multiple users of presenting user client devices 310 may be well below a threshold of 200 milliseconds. Should a presenting user of one or more of presenting user client devices 312 need to engage in interactive dialog with a user of one of presenting user client devices 310, the corresponding presenting user client devices 310, 312 may not be connected to the same origin video server. In this case, the mesh network formed by origin video servers 302-308 can nevertheless provide a sufficiently low-latency interactive video connection between the presenting users' client devices such that a smooth interactive dialog may be engaged in even if, for example, the users are physically located in dispersed geographical locations.

At step 404, the video streams are selectively relayed to other origin video servers, such as origin video server 304. In some embodiments, the mesh network made up by origin video servers 302-308 may selectively self-configure to provide internal connections within the mesh network. Such self-configuration may be performed on the basis of RTCP statistics collected at various nodes within the mesh network enabling on-the-fly topology changes within the mesh network. Such real time control statistics may also be used to predict that scaling up or down of a number of origin video servers may be needed. As depicted in FIG. 3, origin video server 302 is directly connected to origin video servers 304 and 308. As depicted, origin video server 302 does not have a direct connection to origin video server 306. In fact, as depicted, origin video servers 304 and 306 do not have direct connections to any client devices or any edge video servers. This lack of connections to client devices and edge video servers may be as a result of the fact that the non-connected origin video servers 304 and 306 are about to be decommissioned for a software upgrade or for mesh network scaling. Alternatively, the non-connected origin video servers 304 and 306 may just have been brought up and added to the mesh network with the expectation that additional edge video servers (or client devices) are about to need additional origin video servers as in the case of scaling up for a multitude of users to participate in a number of virtual event breakout sessions. In such a case, the users participating in a breakout session may either connect via edge video servers 324, 326, 328 or the users may be promoted to connect directly to an origin (or trunk) video server. In some embodiments, when a new user (whether a presenting user or a viewing user) connects to a video server (whether an origin server or an edge server) the user may first connect to load balancing server 330 that ascertains the latency needs of a particular server based on attributes associated with the user, such as whether the user is a presenter or a general attendee, which sessions the user has expressed interest in, and in which geography the user is located. In this way, load balancing server 330 can help assign users to an appropriate video server.

In addition to dynamically distributing users to appropriate video servers, load balancing server 330 can facilitate software upgrades at the various video servers of various types. Once a video server is flagged as running an outdated version of software, new users will cease to be assigned to the video server, and when all users have dropped off the video server running outdated software, the video server can be decommissioned. Newly provisioned video servers are then provisioned with current software versions. Additionally, video stream quality may be monitored at various candidate client devices to determine whether the associated video stream quality and/or latency falls below a predetermined quality or latency threshold. In cases where the video stream quality or latency has fallen below the predetermined quality threshold, it may be determined that one or more client devices would experience improved video performance by using a video server in an alternate geographical location. In some other embodiments, unacceptable video quality may be associated with a failure of a video server. In some such embodiments, detecting a failed video server may result in switching some or all of the client devices connected to the failed video server to an alternate video server.

At step 406, video streams are transmitted to other presenting client devices. A purpose of the mesh network formed by a group of origin video servers is to provide a low-latency, trunked set of video streams at each of the origin video servers participating in the mesh network. In this way, any presenting user that is using one of presenting user devices 310 or 312 can have low-latency access to video streams being presented in real time by any other presenting user connected to the mesh network. This allows all connected presenting users to have the ability to engage in smooth interactive dialog with other presenting users and otherwise seamlessly communicate with other users participating in video streaming with a device connected directly or indirectly with the mesh network formed by the origin video servers. At step 408, video streams are received at edge video servers such as edge video servers 324, edge video server 326 and edge video server 328. By receiving video streams from nodes participating in the mesh network formed by the origin video nodes, edge video servers can scale out to further propagate video streams to viewing users, either directly or in connection with CDN resources that are geographically proximate to the viewing users themselves.

At step 410, composite video is optionally rendered at one or more edge video servers, such as edge video servers 324. In some embodiments, the optional rendering of the composite video involves mixing one or more of a video graphic overlay, scrolling text, prerecorded video, and a video graphic underlay with the other video streams received at the corresponding edge video server. In alternative embodiments, the optional rendering of the composite video takes place at a corresponding origin (or trunk) video server such that the video stream(s) provided from, for example, origin video server 302 to edge video server 324 is pre-mixed in advance of being propagated from origin video server 302 to edge video server 324. In such a scenario, an origin video server may be referred to as a production origin video server.

Finally, at step 412 streaming video is transmitted to participant client devices, such as participant client devices 314. In some embodiments, transmitting the production video stream involves transmitting a production video stream to one or more content delivery networks. In these embodiments, edge video servers 324 and 328 instruct the one or more CDN 332 to respond to requests for the production video stream. In some such embodiments, CDN 332 provide cached access to the production video stream to various participant client devices 318, 320, and 322.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims. Although the invention has been described with reference to the embodiments illustrated in the attached drawing figures, it is noted that equivalents may be employed, and substitutions made herein, without departing from the scope of the invention as recited in the claims.

The invention claimed is:

1. A system for propagating one or more large-scale video streams based on network proximity and required transmission latency, the system comprising:
a plurality of origin video servers arranged in an interconnected mesh network;
a plurality of presenting client devices, each presenting client device connected to an origin video server of the plurality of origin video servers,
wherein each origin video server of the plurality of origin video servers comprises at least one first non-transitory computer-readable memory storing first computer-executable instructions that, when executed by at least one origin video server processor, carry out actions comprising:
receiving, from a connected presenting client device, a video stream; and
responsive to receiving the video stream:
relaying the video stream to the plurality of presenting client devices via the interconnected mesh network; and
transmitting the video stream to at least one edge video server of a plurality of edge video servers;
the plurality of edge video servers, each edge video server connected to at least one origin video server of the plurality of origin video servers;
a plurality of participant client devices, each participant client device connected to an edge video server of the plurality of edge video servers,
wherein each edge video server of the plurality of edge video servers comprises at least one non-transitory computer-readable memory storing computer-executable instructions that, when executed by at least one edge video server processor, carry out actions comprising:
receiving the video stream from the at least one origin video server; and
responsive to receiving the video stream, broadcasting the video stream to the plurality of participant client devices,
wherein at least one participant client device of the plurality of participant client devices comprises at least one second non-transitory computer-readable memory storing second computer-executable instructions that, when executed by at least one processor of the at least one participant client device, carry out actions comprising:
receiving the video stream from the edge video server; and
displaying the video stream on a display of the at least one participant client device; and
at least one load balancing server configured to assign a client device to the origin video server or to the edge video server based on the required transmission latency associated with the client device,
wherein the at least one load balancing server does not assign the client device to the origin video server or to the edge video server when the origin video server or the edge video server is scheduled for a software upgrade.

2. The system of claim 1, wherein the interconnected mesh network is a partially connected mesh network having each origin video server indirectly connected to every other origin video server.

3. The system of claim 2, wherein the interconnected mesh network is configured to dynamically establish direct connections between the plurality of origin video servers to minimize latency between the plurality of presenting client devices.

4. The system of claim 1, wherein the at least one edge video server processor further carries out actions comprising: rendering a production video stream by mixing the video stream with at least one video streaming asset.

5. The system of claim 4,
wherein the system further comprises a content delivery network connected to the at least one edge video server,
wherein the content delivery network is configured to provide cached access to the production video stream for the plurality of participant client devices.

6. The system of claim 5, wherein the content delivery network is a real time content delivery network.

7. A method of propagating one or more large-scale video streams based on geographical proximity and required transmission latency, the method comprising:
assigning, by a load balancing server, a plurality of client devices to one of a plurality of origin video servers or one of a plurality of edge video servers based on the required transmission latency associated with each of the plurality of client devices,
wherein the plurality of client devices comprises a plurality of presenting client devices and a plurality of participant client devices,
wherein the load balancing server does not assign the plurality of client devices to origin video servers or edge video servers scheduled for a software upgrade;
receiving, at a first origin video server of the plurality of origin video servers, a video stream from a presenting client device of the plurality of presenting client devices,
wherein each presenting client device of the plurality of presenting client devices is connected to an origin video server of the plurality of origin video servers based on geographical proximity to the origin video server;
relaying the video stream to the plurality of presenting client devices through an interconnected mesh network formed by at least a subset of the plurality of origin video servers;
transmitting the video stream from the first origin video server to at least one edge video server of the plurality of edge video servers;
receiving the video stream at the at least one edge video server; and
broadcasting, from the at least one edge video server, the video stream to at least one participant client device of the plurality of participant client devices,
wherein the at least one participant client device is connected to an edge video server of the plurality of edge video servers based on geographical proximity to the edge video server.

8. The method of claim 7, further comprising: rendering, by at least one of the plurality of origin video servers or at least one of the plurality of edge video servers, a production composite video stream by mixing the video stream with one or more streaming video assets.

9. The method of claim 7, further comprising:
wherein the at least one participant client device is a view-only participant of the video stream.

10. The method of claim 7, further comprising:
receiving a request from a participant client device to transmit data for the video stream; and
responsive to receiving the request, re-assigning the participant client device to one of the plurality of origin video servers to improve a latency for the participant client device.

11. The method of claim 7, further comprising aggregating the plurality of presenting client devices and the plurality of participant client devices onto a minimum set of origin video servers and edge video servers.

12. The method of claim 11, further comprising:
responsive to a number of the plurality of presenting client devices connected to the first origin video server in a geographic region reaching a first threshold number, deploying an additional origin video server in the geographic region; and
responsive to a number of the plurality of participant client devices connected to the edge video server in the geographic region reaching a second threshold number, deploying an additional edge video server in the geographic region.

13. The method of claim 7, further comprising:
receiving an additional video stream from an additional presenting client device of the plurality of presenting client devices; and
transmitting the additional video stream to the plurality of presenting client devices via the interconnected mesh network.

14. One or more non-transitory computer-readable media storing computer-executable instructions that, when executed by a processor, perform a method of propagating a large-scale video stream based on geographical proximity and required transmission latency, the method comprising:
receiving, at a first origin video server of a plurality of origin video servers, a first video stream from a first presenting client device of a plurality of presenting client devices,
wherein the plurality of origin video servers is arranged in an interconnected mesh network;
relaying the first video stream to the plurality of presenting client devices through the interconnected mesh network;
transmitting, from the first origin video server to at least one edge video server of a plurality of edge video servers, the first video stream;
broadcasting, from the at least one edge video server, the first video stream to at least one participant client device of a plurality of participant client devices;
receiving, at a second origin video server of the plurality of origin video servers, a second video stream from a second presenting client device;
relaying the second video stream to the plurality of presenting client devices through the interconnected mesh network;
receiving a request from a participant client device to transmit data for the first video stream; and
responsive to receiving the request, re-assigning the participant client device to one of the plurality of origin video servers.

15. The one or more non-transitory computer-readable media of claim 14, wherein the interconnected mesh network is self-configuring to dynamically establish connections among the plurality of origin video servers based on real time control statistics.

16. The one or more non-transitory computer-readable media of claim 14, further comprising:
responsive to detecting a latency associated with a presenting client device connected to an initial origin video server exceeding a threshold latency value, connecting the presenting client device to a new origin video server.

17. The one or more non-transitory computer-readable media of claim 16, wherein the new origin video server is located in a geographic location distinct from a geographic region of the initial origin video server.

18. The one or more non-transitory computer-readable media of claim 14, the method further comprising:
- transmitting the first video stream from the at least one edge video server to one or more content delivery networks; and
- instructing the one or more content delivery networks to respond to requests for the first video stream.

19. The one or more non-transitory computer-readable media of claim 14, the method further comprising:
- assigning, by a load balancing server, a plurality of client devices to one of the plurality of origin video servers or one of the plurality of edge video servers based on the required transmission latency associated with each of the plurality of client devices.

20. The one or more non-transitory computer-readable media of claim 19, wherein the load balancing server does not assign the plurality of client devices to an origin video server or an edge video server scheduled for a software upgrade.

* * * * *